United States Patent

Hannes et al.

[11] Patent Number: 5,135,145
[45] Date of Patent: Aug. 4, 1992

[54] MOUNTAIN BIKE RACK

[75] Inventors: Kenneth J. Hannes, Madison; Ervin L. Severson, Oregon, both of Wis.

[73] Assignee: Graber Products, Inc., Madison, Wis.

[21] Appl. No.: 587,399

[22] Filed: Sep. 25, 1990

Related U.S. Application Data

[63] Continuation-in-part of Ser. No. 414,683, Sep. 29, 1989, abandoned.

[51] Int. Cl.⁵ .................................................. B60R 9/10
[52] U.S. Cl. ...................................... 224/314; 224/321; 224/329; 224/42.03 B
[58] Field of Search ................. 224/42.03 B, 314, 324, 224/321, 329, 330, 331, 309; 211/100, 171, 17, 18, 22

[56] References Cited

U.S. PATENT DOCUMENTS

| | | | |
|---|---|---|---|
| 1,586,854 | 6/1926 | Stansfield | 211/171 |
| 2,597,649 | 5/1952 | MacBeth | 403/399 |
| 3,539,209 | 11/1970 | Takashima | 403/207 |
| 4,299,341 | 11/1981 | Copeland et al. | 224/42.03 B |
| 4,383,629 | 5/1983 | Kerkow | 224/42.07 |
| 4,394,948 | 7/1983 | Graber | . |
| 4,452,385 | 6/1984 | Prosen | . |
| 4,513,897 | 4/1985 | Graber | . |
| 4,830,250 | 5/1989 | Newbold et al. | . |

FOREIGN PATENT DOCUMENTS

3235248 3/1984 Fed. Rep. of Germany ... 224/42.03 B

Primary Examiner—Linda J. Sholl
Attorney, Agent, or Firm—Fuller, Ryan, Hohenfeldt & Kees

[57] ABSTRACT

Disclosed herein is a bike carrier with rotary mounting means to adjust the angle of the support arms. A wide base with diverging frame portions provides support for heavy mountaineer bikes. Soft sleeves on the support arms have recesses to position several bikes in spaced relationship. In one embodiment rigid tubular arms fasten the rack to the gap between the roof and door of a van or wagon.

8 Claims, 7 Drawing Sheets

MOUNTAIN BIKE RACK

CROSS-REFERENCE TO RELATED APPLICATION

This application is a continuation-in-part of application Ser. No. 07/414,683, filed Sep. 29, 1989, now abandoned.

FIELD OF THE INVENTION

The invention relates to bike carriers for the rear of a vehicle.

BACKGROUND OF THE INVENTION

The various carriers of the invention disclosed herein are particularly adapted for supporting the heavier bikes such as the mountain bikes. Various accessory bike racks have been developed. U.S. Pat. Nos. 4,394,948; 4,513,897; 4,452,385; and 4,830,250 are examples of prior art patents on bike racks. All of these patents have at least two support frames with each support frame made up of two legs. The '385 patent has front and rear legs in a fixed relationship whereas the other patents mentioned above have some range of angular adjustment between the legs to accommodate different shaped trunks or rear extremities of the vehicles. The '897 and '948 patents have forward legs which are fixed to side plates. Rear legs which engage the rearmost portion of the vehicle have a range of angular adjustment provided by slots in the plates and rivets in the legs which move in the slots. U.S. Pat. No. 4,830,250 discloses the use of two U-shaped support frames and two support arms all of which are rotatably supported from a common axis and all of which can be adjusted at the same time when the locking nuts are loose. Although the carrier disclosed in the '250 patent provides a compact folded package, it is difficult to manipulate both the legs and the support arms because all parts are loose at the same time. The legs are not locked in a fixed relationship when adjusting the angle of the support arms to horizontal and the legs can easily slip from the adjusted position. No bike carrier has been successfully developed heretofore which is particularly adapted for use with minivans. FIG. 5 of U.S. Pat. No. 3,710,999 shows a bike design which does use rigid brackets rather than straps for mounting. However, that type of rack is not adaptable for a wide range of modern vehicles and does not provide the stability or support required for several heavy mountain bikes.

SUMMARY OF THE INVENTION

The invention provides a heavy duty bike rack which combines features of the various prior art patents into an improved carrier and in which the support legs have limited angular movement and adjustment of the support arms does not involve or require simultaneous adjustment of the legs which support the carrier on the vehicle. This is accomplished by securing the rearmost support legs to attachment plates as is shown in U.S. Pat. No. 4,513,897. A channel in the plate interfits with the cooperating shape of the leg tube to prevent relative angular movement. A bolt that secures the plate to a rear leg in fixed relationship also provides the axis for the rotary hubs which are formed from two half hub shells with notches which interfit with the cylindrical support arms so that there is no relative movement between the support arms and the toothed hubs. The hubs rotate with the support arms during adjustment of the arms when the hub teeth are disengaged. The bolts extend through the fixed hubs as well as the rotational hub half shells and the bolts are provided with a threaded end which receive manually adjustable lock nuts. Loosening of the lock nuts enables adjustment of the support arms only relative to the axis and relative to the legs but does not loosen the adjustment between the legs. This provides more convenience in assembly and enables adjustment of the support arms when a bicycle is supported on the arms without &:he entire assembly collapsing.

Other features of the invention include shaped support arm rests or sleeves in which grooves are formed in place for carrying the bicycle frames in a spaced support arrangement. The support arm sleeves can be elastomeric. The sleeves provide soft contact with the bike frame parts and minimize damage to the frame and frame finish. A tie down includes an elastic cord which is anchored in the support tube. The free end has a hook. The tie down loops over the bike frame and attaches to an eye anchored in the end of the tubing frame. Other features include a wide tubing support base which is supported on the bumper for added stability for heavy mountain bikes. The wide base is provided by flaring the vertical tubing runs laterally outwardly before joining the bottom tubing run.

A modified embodiment of the bike rack of the invention is provided with elongated arms to fit in the gap between the top of the door of a minivan or wagon for support of the rack and the bikes. A bottom frame run is supported on the vehicle frame adjacent the bumper. Telescopic arms enable a wide range of adjustment to fit various "square back" vehicles.

Further objects, advantages and features of the invention will become apparent from the disclosure.

IN THE DRAWINGS

FIG. 9 is a side elevational view of the bike supporting arm shown in FIG. 8.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
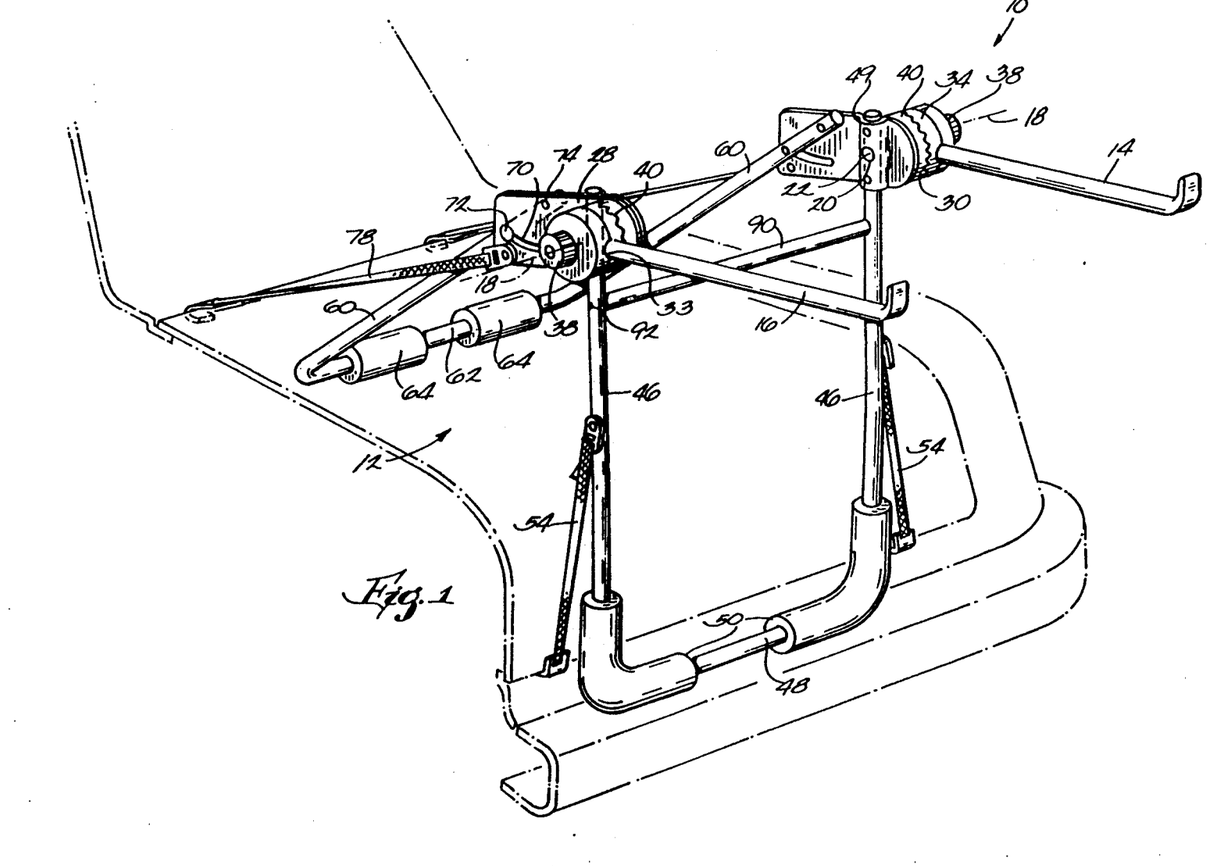
FIG. 1 is a perspective view of one embodiment of the invention showing the carrier on the rear of a vehicle.

In FIG. 1 an accessory rack 10 is shown supported on the rear of a vehicle 12. The bike or load is supported on support arms 14 and 16. Rotary mounting means are provided to afford selective rotary positions of the arms 14 and 16 about a rotary axis 18 for each arm 14, 16. In the disclosed construction the rotary axes are provided by bolts 20 having heads 22 and shaft portions 24 which extend through aperture 26 in spaced plates 28 (FIG. 3). The bolts 20 also extend through fixed hubs 30 and through two rotatable hub halves 32 and 34 which are assembled in allochiral or clam shell relationship about support arms 16. Opposed notches 33 in hub halves 32 and 34 form a round aperture on a diameter line for embracing the support arms 14, 16. The bolts have a threaded portion 36 which threadably receive a manual lock nut 38 used for tightening and releasing the position of the support arms 16. Locking means in the form of teeth are provided on the fixed hub 31 which project axially toward the adjacent face of hub half 34. The rotary hubs 34 have mating interfitting teeth 40 which enable relative rotation when the nut 38 is loose of the movable hub 34 with respect to the fixed hub 30 to provide the adjustment angle, preferably a generally horizontal position of the arms 14, 16, as illustrated in FIG. 2.

Figures 2, 5:
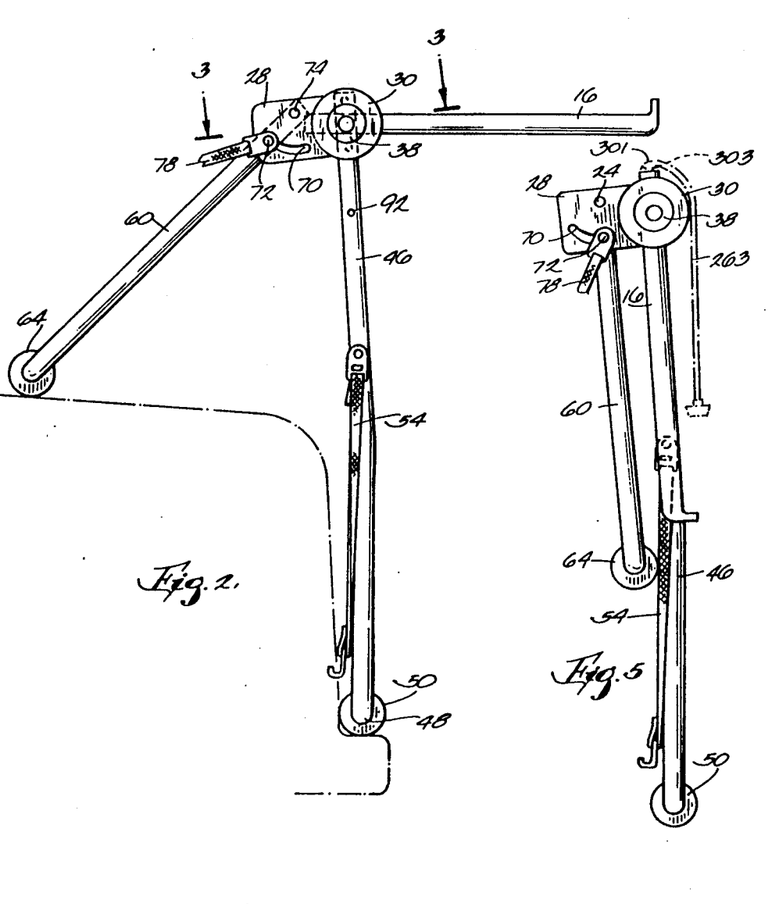
FIG. 2 is a side elevational view of the carrier shown in FIG. 1.
FIG. 5 is a side elevational view of the bike rack in FIG. 1 collapsed.
Figure 2:
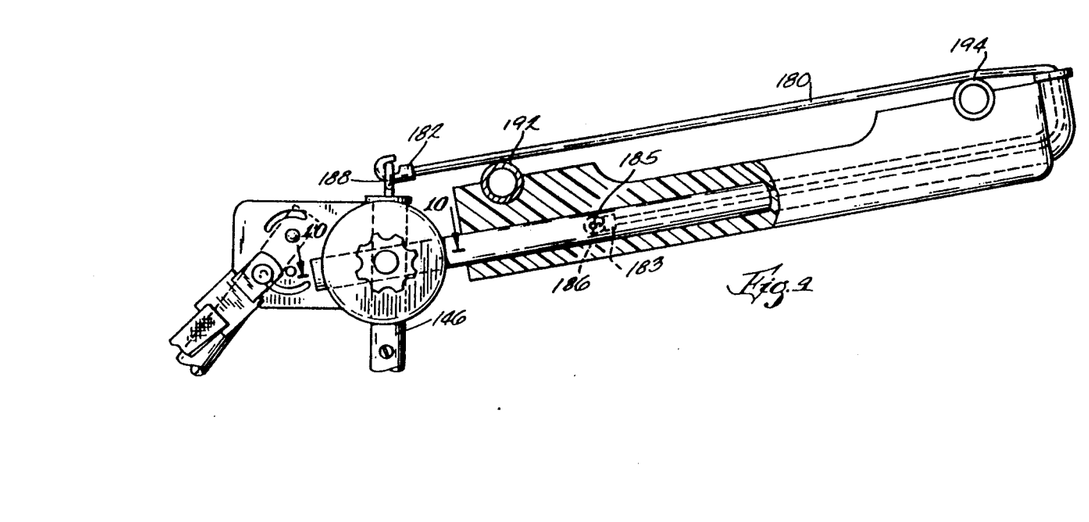
Figure 3:
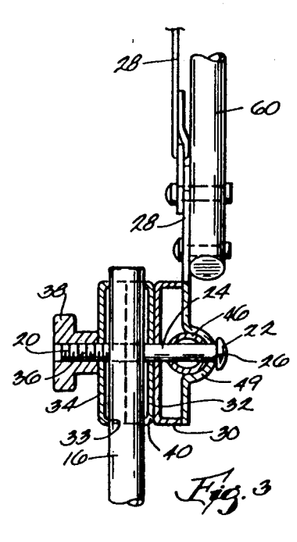
FIG. 3 is a sectional view enlarged along line 3—3 of FIG. 2.

The attachment means for supporting the support arms to the vehicle includes the rear legs 46 which in the embodiment illustrated in FIGS. 1 and 2 includes a connecting web 48 which forms a U-shaped frame made up of the legs 46 and connecting web section 48. The composite leg can be provided with rubber bumpers or pads 50 arranged around the legs and the web tube 48. Straps 54 can be provided for securing the legs 46 to the vehicle in accordance with the teachings of U.S. Pat. Nos. 4,394,948 and 4,513,897, the disclosures of which are incorporated herein by reference. The connection of the rear legs 46 to the plates includes channels 49 in the plates 28 having a curvature complementary to the curvature of the leg tubes 46 so that the leg tubes interfit in the channels 49. This connection prevents rotation of the legs 46 relative to the plates about the axis provided by bolts 20. None of the prior art cited herein employs the channel fastening technique which provides a stronger connection than two rivets 21, 22 as shown in FIG. 1 of the '897 patent. In addition, the curved metal which defines the channels strengthens the plates so they won't bend or distort under the heavier loads of mountain bikes.

The attachment means also includes forward legs 60 which in FIG. 1 are connected by a web portion 62 to make a second U-shaped frame. Cushions or pads 64 can be employed on tube 62. Means are provided for securing the legs 60 to the plates 28. In the disclosed construction the means include slots 70 in the plates, headed pins 72 which are movable in the slots 70 and rivets 74 which provide fixed pivots for the legs 60 relative to the plate 28 and the rear legs 46. This type of fastening technique of the upper legs is illustrated in the '948 patent. Securing straps 78 can be employed as shown in FIG. 1 and also the FIGS. 1 and 2 of the '948 patent with clips to engage the upper panel of the hood.

Figure 4:
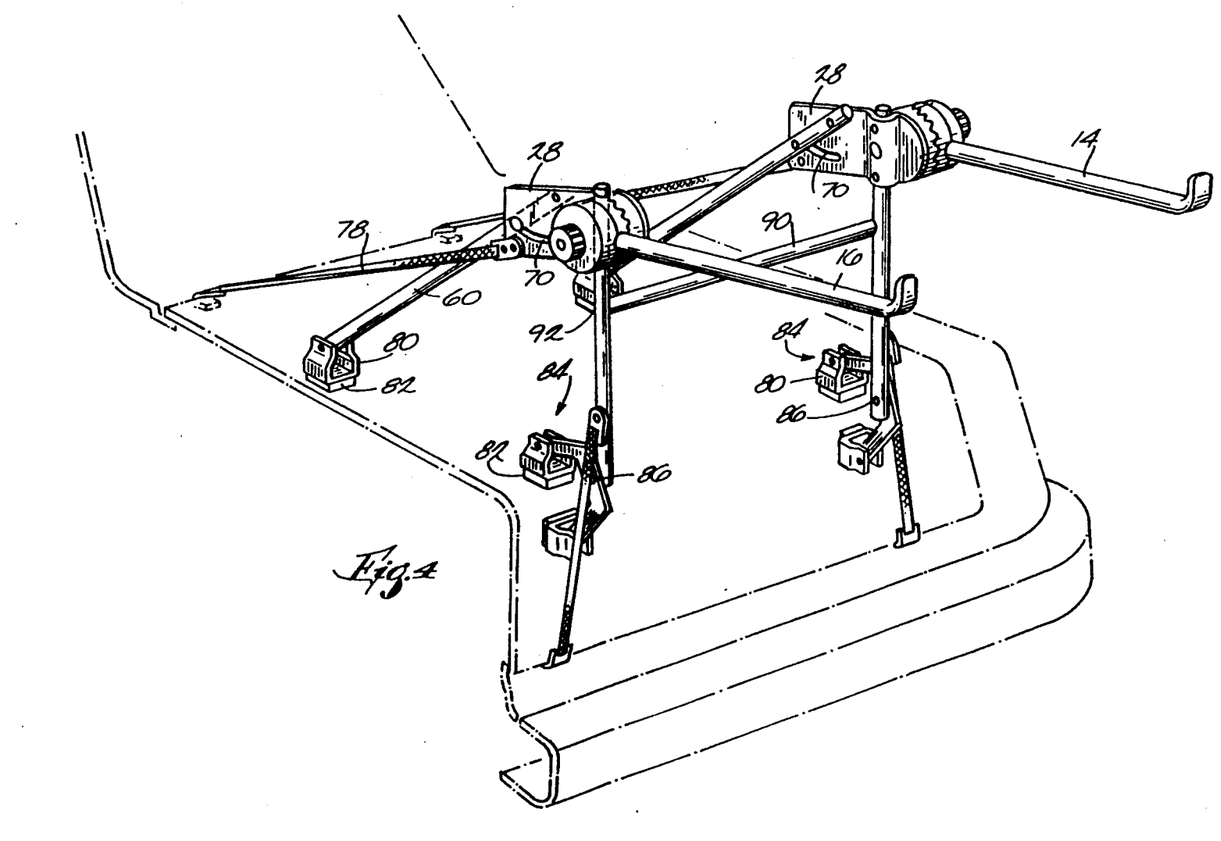
FIG. 4 is a perspective view of a modified embodiment of the invention.

FIG. 4 shows a modified embodiment of the accessory rack of the invention which employs individual padded feet on the support legs rather than U-shaped frames. In this respect the feet correspond to those disclosed in U.S. Pat. No. 4,513,897. The feet have U-shaped brackets 80 provided with pads 82 and also double feet 84 which are commonly pivoted about pivots 86. In the FIG. 4 embodiment the rotary support means for the support arms is the same as that illustrated in FIGS. 1, 2 and 3.

The assembly hereinabove described is rigidified by use of a cross tube 90 which can be bolted by bolts 92 to the forward leg tubes or welded or otherwise secured.

In use of the invention the legs or U-shaped frames would be appropriately adjusted to rest on the vehicle parts and the straps adjusted to secure the frame in place. The support arms can then be adjusted to a horizontal position by loosening the nuts 38 and swinging the arms as the projections or teeth on the hubs skip to the selected angular position. The nuts are then tightened to maintain the support arms 16 in a fixed relationship.

FIG. 5 shows a collapsed position of the carrier. Location of the pivot axis on the center of the rear legs results in a compact folded position.

Figures 6, 7:
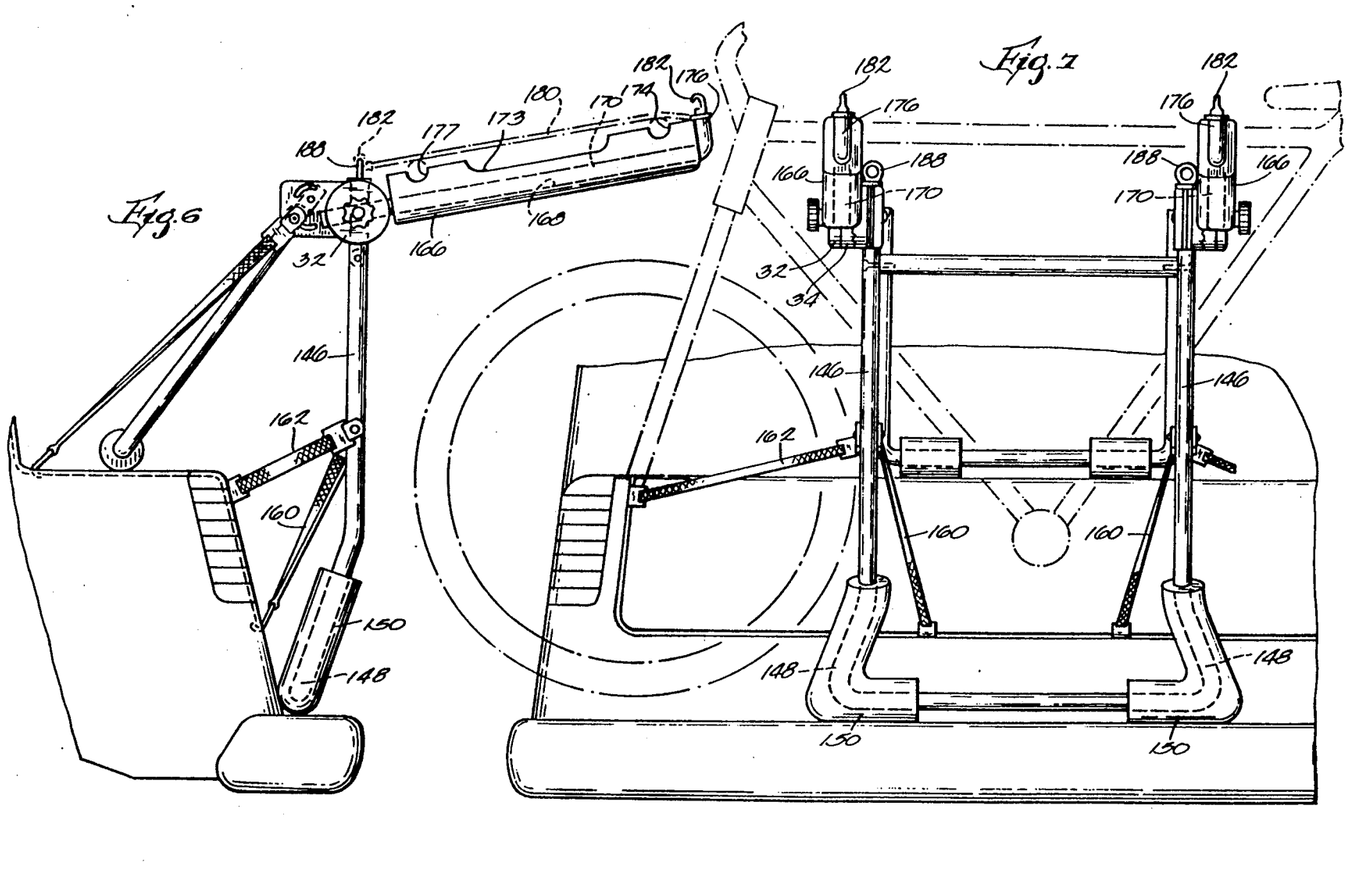
FIG. 6 is a side elevational view of a modified embodiment of a bike rack with a wide base for supporting mountaineering bikes and support arm sleeves.
FIG. 7 is a rear elevational view of the same.
Figures 8, 10:
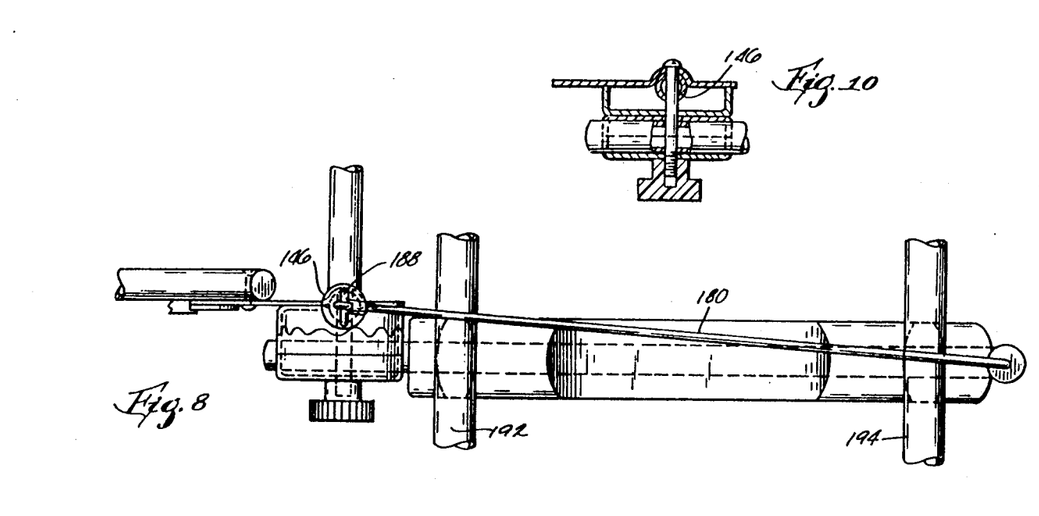
FIG. 8 is an enlarged fragmentary top view of the bike supporting arm shown in FIG. 6.
FIG. 10 is a sectional view along line 10—10 of FIG. 9.

FIGS. 6, 7, 8, 9 and 10 show a modified embodiment of the bike rack shown in FIG. 1 in which the leg tubes 146 have lower ends 148 which extend laterally and angularly downwardly and diverge outwardly to provide a wide base. The lower ends are also inclined forwardly as illustrated in FIG. 6 to position the rack close to vertical portions of the vehicle forward of the bumper. Elastomeric sleeves 150 can be provided to cushion the contact between the bike frame and the vehicle. The wide base is particularly suited for heavy bikes such as mountain bikes and provides additional lateral support. Extra straps 160 can be provided as well as straps 162 for hold down purposes.

The embodiment in FIGS. 6 and 7 is provided with shaped support arm sleeves 166 which have a longitudinal opening 168 for the bike support tubes 170 to telescopically receive the sleeve. The sleeves can be made of plastic or various elastomeric or foam rubber to provide a cushioned support for the bike frame with a non-marring finish to prevent damage to the bike frame and bike finish. Transverse notches 172, 174 are provided for the horizontal cross members of bike frames. A central recess 173 is provided to accommodate a third bike and afford a range of fore and aft adjustment for the position of the bikes to enable at least three bikes to interfit in side-by-side relationship.

The sleeves 166 are held in place by upturned tubing ends 176 of the tubes 170. The upturned tube ends 176 confine the sleeves between the ends 176 and the locking hubs 32 and 34.

Hold down means are provided for securing or holding bike frames in the recesses on the support arms. As best shown in FIG. 9 an elastic cord 180 has a hook 182 attached to the free end of the cord and has an inner cord end 183 anchored in the lock hubs or in the support arm tube, for example, by a pin 185 or end 186. An eye 188 anchored at the end of tube 146 cooperates with the hook to secure the hold down in place over the bike frame parts 192 and 194 shown in FIGS. 8 and 9.

Figures 11, 12:
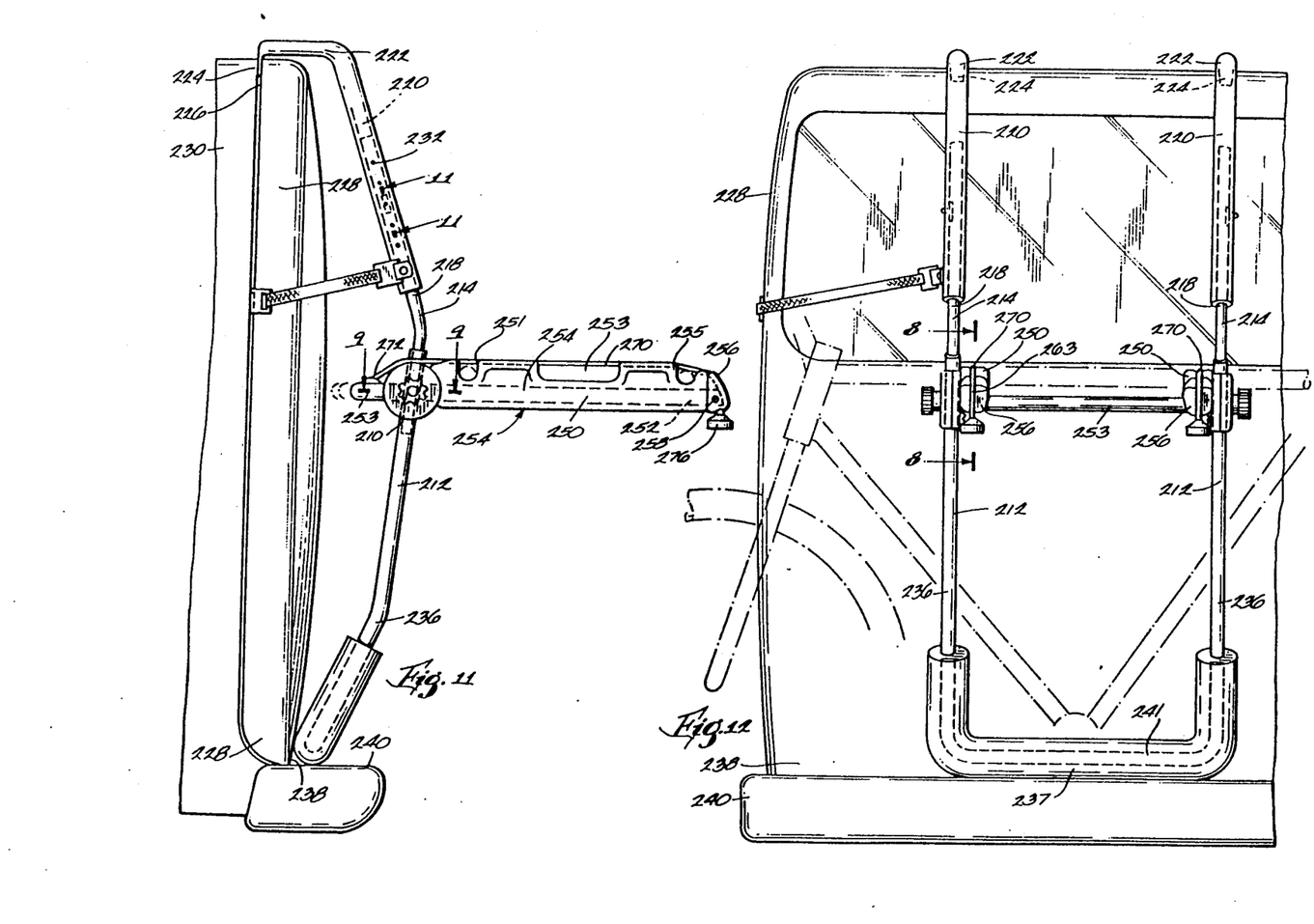
FIG. 11 is a side elevational view of a modified embodiment of a bike rack intended for use with a minivan or wagon with a modified embodiment of the support arm and tie down.
FIG. 12 is a rear elevational view of the bike rack shown in FIG. 11.
Figure 13:
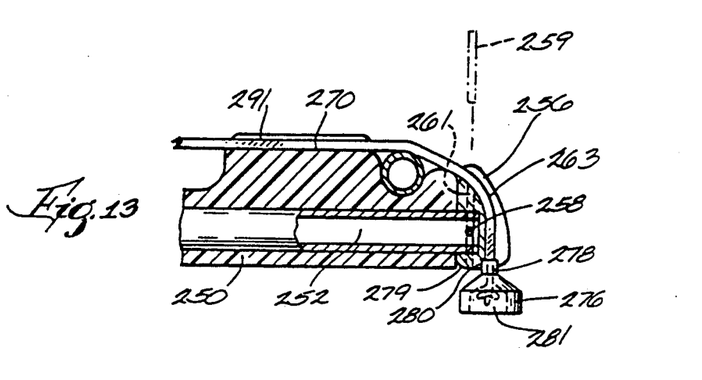
FIG. 13 is a sectional view along line 13—13 of FIG. 12.
Figure 14:
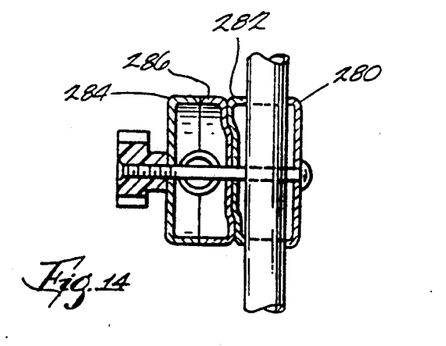
FIG. 14 is a sectional view along line 14—14 of FIG. 11.

The modified embodiment of the bike rack shown in FIGS. 11 and 12 is adapted for use with square end vehicles such as minivans, wagons or the like. The bike support arms 250 are the legs of a U-shaped frame with a connecting tube portion 253.

To provide rigid support for the bike rack, the rack is connected to the gap between the top of the rear vehicle door or window and adjacent the door or window frame. In this regard, the upper ends 210 of the lower frame members 212 receive lengths of tubing 214 of a diameter less than the diameter of tubing 212. The tubes 214 have a bend or angle to form two angularly related portions. The upper ends 218 interfit in the lower ends of the upper mounting tubes 220. The upper tubes have forwardly extending angled end portions 222 and a downwardly depending flange portion 224 which is adapted to interfit in the gap 226 between a rear door 228 and body 230.

Figure 16:
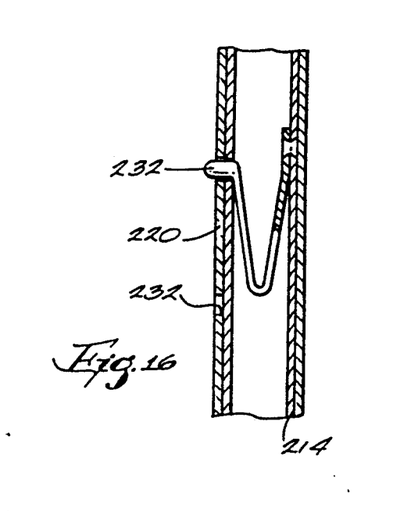
FIG. 16 is a sectional view along line 16—16 of FIG. 11.

The tube 214 is telescopically related to tube 220 and interfits thereto and bolts or spring loaded pins 232 and apertures 233 (FIG. 16) can be employed to secure tube 218 and tube 220 at the adjusted length which fits the vehicle. The lower tube 212 has an inwardly and forwardly extending section 236 which enables the end of the leg to fit into the corner 238 between the bumper 240 and the door 228. Thus, the telescopic adjustment capability enables proper positioning of the frame between the vehicle bumper and top of the door. An elastomeric sleeve 237 can be employed at the bottom of the frame around tubes 236 and bottom tube 241.

Figure 15:
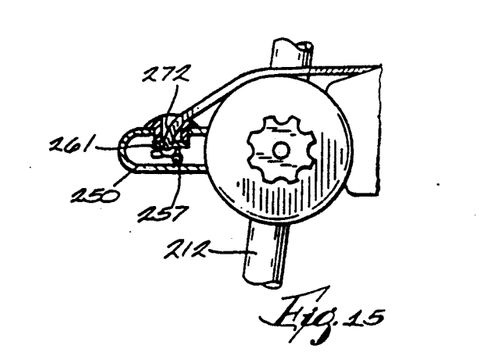
FIG. 15 is an enlarged view of the connection of the hold down strap shown in FIG. 11.

The bike rack shown in FIGS. 11 and 12 is provided with a U-shaped frame 254 with two leg portions 252 which receive arm supporting sleeves 250. The sleeves 250 are secured in place by plastic or metal nose pieces 256 which are pinned to the bike support tube 250 by cross pins 258. As shown in FIGS. 13, 14, 15 and 16 a hold down elastic 270 is provided which has an end 272 anchored as shown in FIG. 15 in the rear of tube 252. The free end of the hold down elastic 270 is provided with an anchor 276 which has a small diameter annular shoulder 278 which interfits in a socket aperture 280 in the nose piece. That is the normal storage position.

The support arm sleeves in FIG. 11 are desirably made from a PVC rubber with a durometer of 50 to 60. Other elastomeric material can be employed. Transverse grooves or recesses 251, 253 and 255 are molded in place for bike storage.

In this embodiment the means for locking the support arms in the desired position comprises two half shell hub portions 280 and 282 and hub portions 284 and 286 also employed in the FIG. 1 embodiment.

We claim:

1. An accessory carrier for a motor vehicle comprising a pair of support arms for supporting a load remote from the vehicle,
    mounting means for supporting said support arms for rotation of the support arms into any one of a plurality of defined angular positions about a horizontal rotational axis,
    each of said mounting means including a fixed hub supported on a fixed horizontal axis and a rotary hub supported for rotation on said fixed axis and integral with said support arms for rotation during swinging adjustment movement of said support arms and lock means on said fixed hubs cooperating with lock means on said rotary hubs to maintain the support arms in any one of a plurality of selected angular positions and vehicle attachment means comprising front legs and rear legs for supporting said carrier on the vehicle,
    said attachment means including side plates fixed to said fixed hubs, said front legs being pivotally attached to said plate, said rear legs being fastened to said plates by means of elongated channels formed in said plates which nestingly receive said rear legs, said horizontal axis extending through said legs and said plates, said fixed hubs being secured in a stationary, fixed relationship relative to said rear legs, and said rear legs being positioned between said plates and said fixed hubs.

2. The accessory carrier of claim 1 wherein said rotary mounting means includes a manually manipulatable lock nut threaded on said bolt for maintaining engagement of said locking means when said support arms are in the selected position and said lock nuts affording release of said locking means and manipulation of the rotary hubs with respect to the fixed hubs when said nuts are counter rotated to change the angular position of the support arms.

3. The accessory carrier of claim 1 wherein said attachment means include a pair of forward legs and means for adjustably connecting said forward legs to said plates to afford angular movement of said forward legs relative to said plates.

4. The accessory carrier of claim 1 wherein a bolt passing through the rotational axis of said hubs secures said leg tubes in said channels in fixed relationship.

5. The accessory carrier of claim 1 wherein said legs include outwardly diverging tubular run portions connected to a base tube to provide broad based support for said carrier on said vehicle.

6. The accessory carrier of claim 7 wherein said run portions angle forwardly in a plane transverse to said leg portions.

7. An accessory carrier according to claim 1 wherein said rear legs comprises leg portions in a first plane and leg portions in the second plane transverse to said first plane, and toward the vehicle, said leg portions in said second plane diverging laterally outwardly and joining a base tube longer than the spacing of said first tube portions.

8. In an accessory carrier for a motor vehicle comprising front and rear frames having lower ends adapted to engage a vehicle and support a load in a position clear of the vehicle,
    said frame having upper ends and plate attachment means for tying the upper ends of said frames together, the improvement comprising a pair of load supporting arms and rotational support means for mounting said support arms to plates,
    said rotational support means further comprising a fixed hub secured to said plates and rotational hubs secured to said support arms,
    said hubs being provided with circumferentially arranged interlocking teeth on opposed adjacent surfaces of said hub, and nut means to clamp said teeth in locking relationship to fix the angle of the support arms relative to the frames and to unclamp said teeth and release said teeth for changing the angel of the support arms to another selected position, the plate and the fixed hub containing elongated channels that nestingly engage opposite sides of a component of said rear frame, thereby positioning said rear frame between said plates and said fixed hubs.

* * * * *

UNITED STATES PATENT AND TRADEMARK OFFICE
CERTIFICATE OF CORRECTION

PATENT NO. : 5,135,145
DATED : August 4, 1992
INVENTOR(S) : Kenneth J. Hannes, and Ervin L. Severson It is certified that error appears in the above—identified patent and that said Letters Patent is hereby corrected as shown below:

Column 6, line 35:

Change the claim dependency from "claim 7" to read --- claim 5 ---.

Column 6, line 39:

Delete "comprises" and substitute --- comprise ---.

Column 6, line 62:

Delete "angel" and substitute --- angle ---.

Signed and Sealed this

Twenty-eighth Day of September, 1993

Attest:

BRUCE LEHMAN

*Attesting Officer*  *Commissioner of Patents and Trademarks*